US012446799B2

(12) United States Patent
Lai et al.

(10) Patent No.: US 12,446,799 B2
(45) Date of Patent: Oct. 21, 2025

(54) METHOD AND DEVICE FOR MEASURING ANATOMICAL MOVEMENT OF A JOINT

(71) Applicant: PRECIX PTE LTD, Singapore (SG)

(72) Inventors: Kah Weng Lai, Singapore (SG); Gim Song Soh, Singapore (SG); Mian Yi Tan, Singapore (SG); Yu Feng Zhou, Singapore (SG); Dinesh Kumar Chobey, Singapore (SG)

(73) Assignee: PRECIX PTE LTD, Singapore (SG)

( * ) Notice: Subject to any disclaimer, the term of this patent is extended or adjusted under 35 U.S.C. 154(b) by 929 days.

(21) Appl. No.: 17/293,773

(22) PCT Filed: Nov. 5, 2019

(86) PCT No.: PCT/SG2019/050540
§ 371 (c)(1),
(2) Date: May 13, 2021

(87) PCT Pub. No.: WO2020/101569
PCT Pub. Date: May 22, 2020

(65) Prior Publication Data
US 2022/0000395 A1    Jan. 6, 2022

(30) Foreign Application Priority Data

Nov. 14, 2018   (SG) ............................ 10201810156P

(51) Int. Cl.
*A61B 5/11*   (2006.01)
*A61B 5/00*   (2006.01)
(Continued)

(52) U.S. Cl.
CPC ............ *A61B 5/1114* (2013.01); *A61B 5/1107* (2013.01); *A61B 5/1127* (2013.01);
(Continued)

(58) Field of Classification Search
CPC ... A61B 5/1114; A61B 5/1107; A61B 5/1127; A61B 5/1128; A61B 5/389;
(Continued)

(56) References Cited

U.S. PATENT DOCUMENTS

2006/0161225 A1* 7/2006 Sormann ............. A61B 5/6862
607/61
2010/0198067 A1   8/2010 Mahfouz et al.
(Continued)

FOREIGN PATENT DOCUMENTS

CN    101254103 A    9/2008
CN    105596021 A    5/2016
(Continued)

OTHER PUBLICATIONS

International Search Report in PCT/SG2019/050540 mailed Jan. 23, 2020.
(Continued)

*Primary Examiner* — Jason M Sims
*Assistant Examiner* — Kyle W. Kretzer
(74) *Attorney, Agent, or Firm* — Thomas Horstemeyer, LLP

(57) ABSTRACT

A method for measuring dynamic movement of a joint, the method comprising the steps of: measuring relative rotation of the joint using pair of Inertia measurement units, each attached to the skin on either side of said joint; capturing a plurality ultrasound images of a bone proximate to a first of said IMU's; identifying markers on said bone; tracking displacement of the markers; correlating said displacement with the relative rotation of the joint, and so; measuring the dynamic movement of the joint.

6 Claims, 10 Drawing Sheets

(51) Int. Cl.
*A61B 5/389* (2021.01)
*A61B 8/00* (2006.01)

(52) U.S. Cl.
CPC ............ *A61B 5/1128* (2013.01); *A61B 5/389* (2021.01); *A61B 5/6812* (2013.01); *A61B 8/5207* (2013.01); *A61B 2505/09* (2013.01); *A61B 2560/0223* (2013.01); *A61B 2562/0219* (2013.01); *A61B 2562/046* (2013.01)

(58) Field of Classification Search
CPC . A61B 5/6812; A61B 8/5207; A61B 2505/09; A61B 2560/0223; A61B 2562/0219; A61B 2562/046; A61B 5/6828; A61B 8/4227; A61B 5/1121; A61B 5/4582; A61B 5/395
See application file for complete search history.

(56) References Cited

U.S. PATENT DOCUMENTS

| | | |
|---|---|---|
| 2012/0029345 A1 | 2/2012 | Mahfouz et al. |
| 2014/0303538 A1 | 10/2014 | Baym et al. |
| 2015/0223753 A1* | 8/2015 | Perkins ................. A61F 2/4657 600/595 |
| 2016/0284231 A1* | 9/2016 | Walsh ................ G09B 19/0038 |
| 2017/0181698 A1* | 6/2017 | Wiedenhoefer ...... A61B 5/1121 |
| 2017/0296115 A1 | 10/2017 | Mahfouz et al. |

FOREIGN PATENT DOCUMENTS

| | | |
|---|---|---|
| CN | 106572821 A | 4/2017 |
| CN | 107115114 A | 9/2017 |
| CN | 108324282 A | 7/2018 |
| EP | 2371291 A1 | 10/2011 |
| EP | 2967353 A1 | 1/2016 |
| WO | 2009049062 A2 | 4/2009 |
| WO | 2013119801 | 8/2013 |
| WO | 2014150961 A | 9/2014 |

OTHER PUBLICATIONS

Written Opinion in PCT/SG2019/050540 mailed Jan. 23, 2020.
Masum M A et al: "Precision Assessment of B-Mode Ultrasound for Non-Invasive Motion Analysis of Knee Joints", Digital Image Computing Techniques and Applications (DICTA), 2011 International Conference on, IEEE, Dec. 6, 2011 (Dec. 6, 2011), pp. 279-284, XP032094772, ISBN: 978-1-4577-2006-2, DOI: 10.1109/DICTA.2011.53.

* cited by examiner

METHOD AND DEVICE FOR MEASURING ANATOMICAL MOVEMENT OF A JOINT

CROSS-REFERENCE TO RELATED APPLICATION

This application is the 35 U.S.C. § 371 national stage application of PCT Application No. PCT/SG2019/050540, filed Nov. 5, 2019, where the PCT claims priority to and the benefit of, SG patent application Ser. No. 10/201,810156P, filed Nov. 14, 2018, both of which are herein incorporated by reference in their entireties.

Field of the Invention

The invention relates to a diagnostic device and method for measuring the movement of a joint, for instance a knee joint or shoulder. In particular, the invention relates to quantifying the dynamic function of a joint, for instance as a means of a diagnostic analysis.

BACKGROUND

In order to non-invasively measure joint movement, a number of techniques exist. Photogrammetry is common in biomechanics, whereby images of the joint are taken during motion, and subsequently used to measure relative rotation and displacement. These techniques, however, are inherently flawed in that they actually measure the skin and surrounding tissue, and not the bone(s) from which the joint is comprised.

Alternatives to the flawed approach involved attaching pins directly to the bone that acts as markers for the motion detection. Clearly, the attachment of pins to the bone undermines the concept of non-invasiveness.

More penetrative methods are also possible, such as MRI and CT scans, however these lack the mobility to undertake the diagnostic test during natural motion. They are also costly, both for the practitioner, (capital-intensive equipment), as well as their operating costs, which is passed on to the patient.

Consequently, there is a diagnostic gap for the non-invasive quantification of joint function. Because of the need for non-invasive methods within the market for diagnostic evaluation of a joint, the ability to measure bone movement is often inaccurate, time consuming and ultimately subjective.

SUMMARY OF INVENTION

In a first aspect, the invention provides a method for measuring dynamic movement of a joint, the method comprising the steps of: measuring relative rotation of the joint using pair of Inertia measurement units, each attached to the skin on either side of said joint; capturing a plurality ultrasound images of a bone proximate to a first of said IMU's; identifying markers on said bone; tracking displacement of the markers; correlating said displacement with the relative rotation of the joint, and so; measuring the dynamic movement of the joint.

In a second aspect, the invention provides a system for measuring dynamic movement of a joint, the system comprising: a pair of Inertia measurement units, each attached to the skin on either side of said joint, said IMU's arranged to measure relative rotation of the joint; an ultrasound sensor for capturing a plurality images of a bone proximate to a first of said IMU's, and identifying markers on said bone, and; a control system for receiving the relative rotation from said IMU's and the images captured by said ultrasound; wherein the control system is arranged to measure displacement of the markers and correlate said displacement with the relative rotation of the joint, and accordingly measure the dynamic movement of the joint.

Accordingly, by correlating measured relative rotation of the joint, with specific measurement of the tracking of the bone using ultrasound to identify critical markers, movement of the joint can be more accurately measured.

In one embodiment, electromyography (EMG) sensor may be used to detect muscle activity during movement. In this embodiment, the activity may be calibrated to provide a measure of applied force by the muscle to the joint. Further, the measurement of the force applied by the muscle to the joint may be correlated with measured movement. Consequently, the force and movement detection may provide an accurate diagnostic tool for determining the dynamic function of the joint in question.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

In one embodiment of the present invention, the system is directed to quantify the function of a human joint. In this embodiment, the system correlates data for 1) detecting and measuring the true anatomical bone movement in a human joint and 2) quantifying the amount of force acting through/ across it. The apparatus primarily uses an inertia measurement unit (IMU) placed on the skin to detect the gross movement of the limb, with an ultrasound transducer to provide specific information on the bone movement. In a further embodiment, an electromyogram (EMG) sensor may also be used to measure the applied force applied to the joint, corresponding to the measured movement.

Advantages in using the present invention may include, in various embodiment, as follows:

The ability to measure the true anatomical joint movement parameters non-invasively (including but not limited to dynamic rotational stability)

Assess and compare the dynamic function between both joints (i.e. Left and Right)

Determine rehabilitation status of an injured joint

Figure 1B:
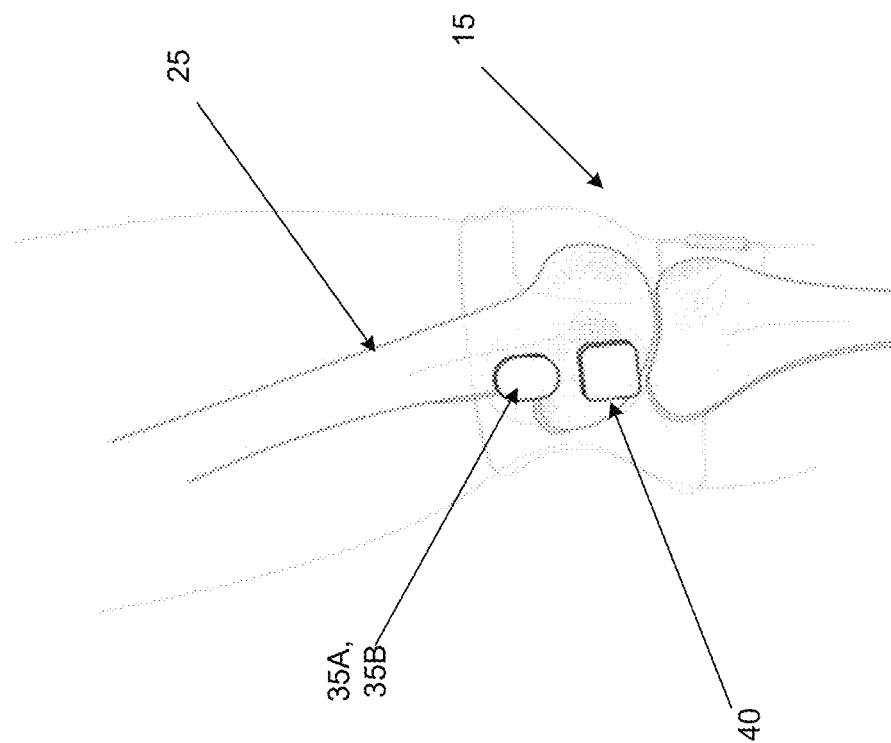
FIG. 1B is a side elevation of the device of FIG. 1A indicating proximity of the bone to the sensors.
Figure 1A:
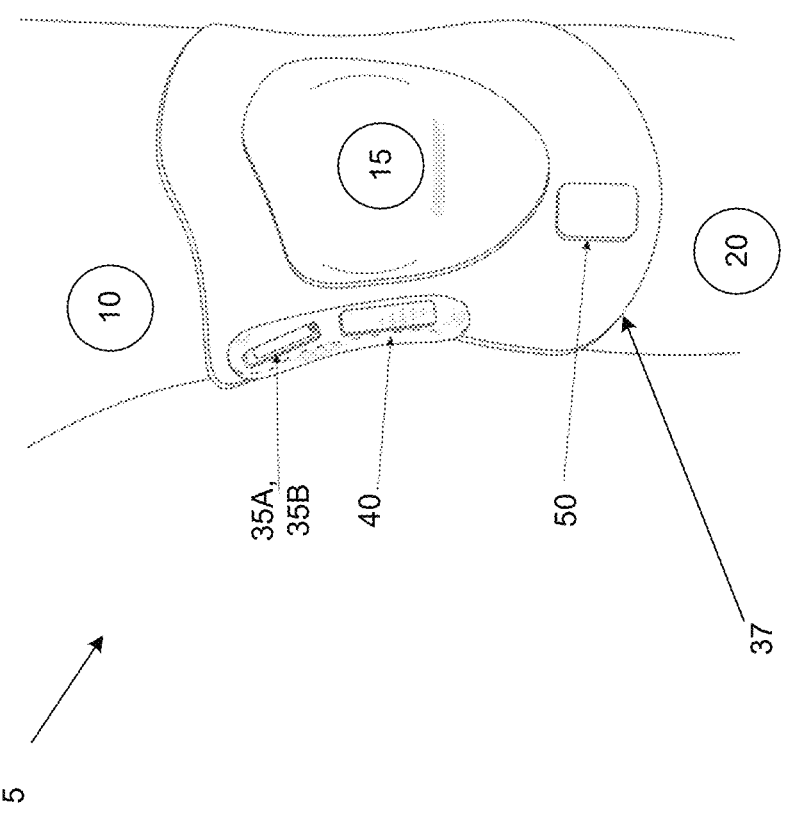
FIG. 1A is an elevation view of a device according to one embodiment of the present invention.

Analyse the joint's function across population norms based on sex, age and weight Predict and prevent injuries associated with the joint by utilising data analytics on the big data sets acquired across a large population, With reference to FIGS. 1A and 1B, here is shown a system 5 for dynamically measuring joint movement, according to one embodiment of the present invention.

In this embodiment, the invention has been applied to a knee joint 15. An IMU 35A is attached side-by-side to an ultrasound transducer 40 and this setup is placed onto the skin of an upper part 10 of the joint 15. The high-refresh rate ultrasound transducer 40 tracks the movement of the bone 25 beneath the skin. This information is used to correct the IMU's 35A position to provide true bone movement, whilst a 2nd IMU 50 setup is placed across the joint on 20 at the lower part of joint 15. The second IMU 50 provides a point of reference for the 1st IMU 35A as the joint 15 moves.

A separate EMG sensor 35B is placed over the skin close to or on the same rigid body the 1st IMU 35A. The EMG 35B may be positioned over the belly of the muscle corresponding to the activation the joint 15, to best pick-up the amplitude of the muscular contraction. The amplitude of the contraction will be correlated to the amount of force that is applied across the joint.

EMG signals are used to benchmark the force applied by the muscle against the joint. By tapping on the signal of a muscle corresponding to joint 15 movement, the device will be able to benchmark muscle activity from that specific muscle for specific movements.

With reference to the system shown in FIG. 1A, the various components are combined in the form of a knee brace 37, which is strategically placed on the vastus medialis where the EMG sensor 35B will pick up the muscular activities. These signals are used to measure muscle activity for specific exercises which will compared to the benchmark.

The ultrasound module 40 tracks markers and movement of the femur bone. The IMU 35A computes the location of the ultrasound and the information is used to determine the actual motion of the femur.

By combining the data from the true bone movement with the force applied across the joint, the system 5 will be able to determine the knee joint's range of motion and dynamic rotational stability in order to provide an objective functional score determining the patient knee's true functional health.

Figures 2A, 2B:
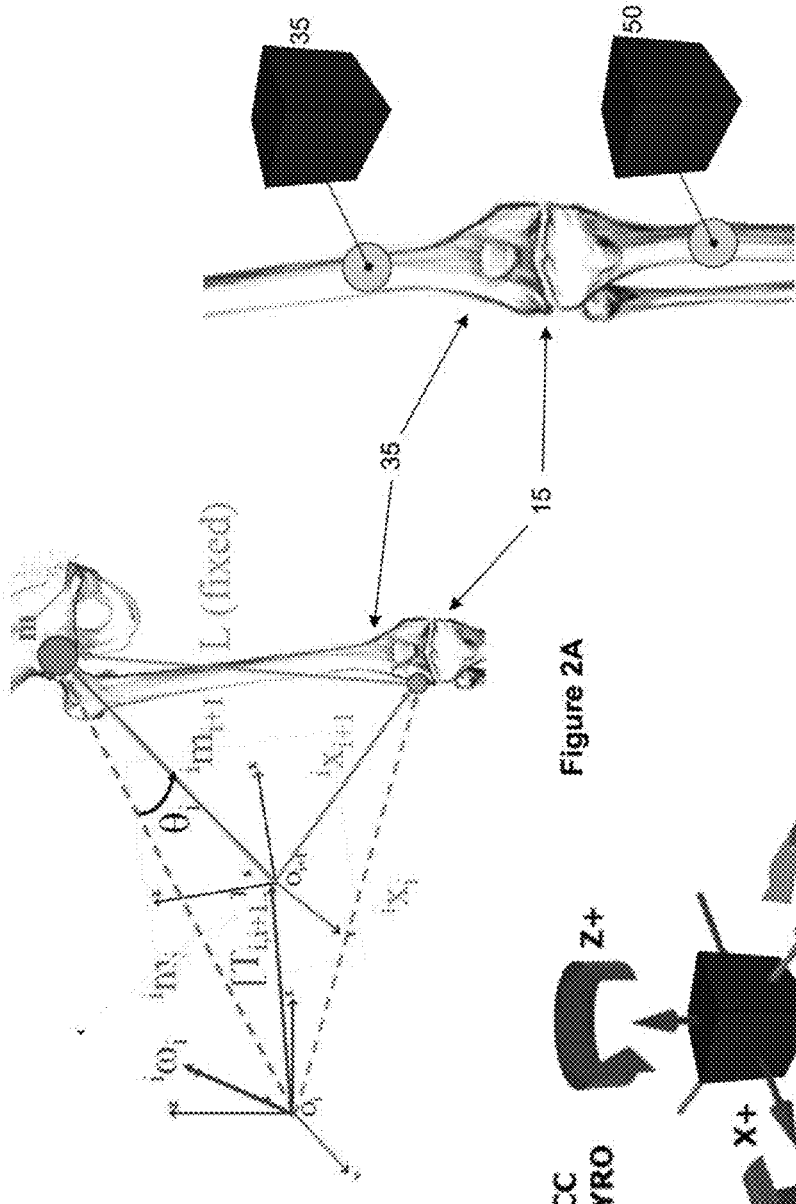
FIGS. 2A to 2C are various views of the positional relationship of the various sensors according to further embodiment of the present invention.
Figure 2C:
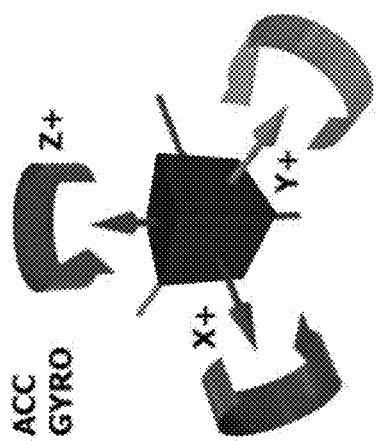

Referring to FIGS. 2A to 2C, a second IMU 50 is placed across the joint 15 from the first IMU 35A. The two IMU modules 35A, 50 in the system is used for the tracking the motion of the limb and joint. By making the patient do preliminary profiling exercises, the device will be able to determine a reference point which can calculate and identify the axis of the joint rotation based on the short calibration activity. The projection of the joint location is on an imaginary space and tracks the whole limb movement. This ability to map out the internal joint map sets our device apart from others.

For example, with reference to the image on the left—if we applied the above concept to the knee joint, by making the patient do preliminary profiling tests, the second IMU 50 across the knee joint allows us to calculate what is the fixed length, L, and hence helps us to determine where point M (the hip) is. This can then be used as a point of reference for all later activities in determining the knee's functional health score.

Figure 3:
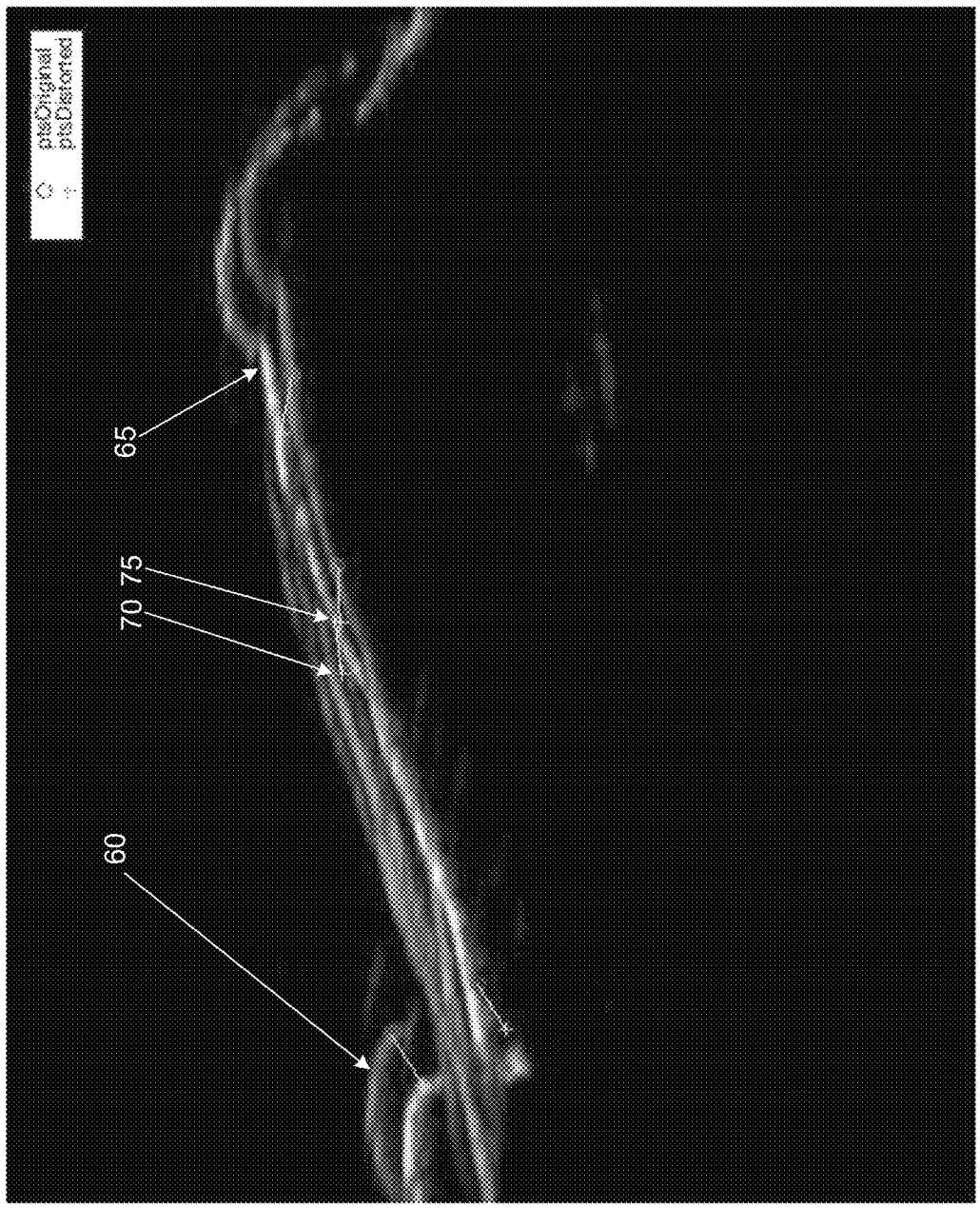
FIG. 3 is an ultrasound view of a movement track of the bone in a joint as measured by a device according to one embodiment of the present invention.
Figure 4:
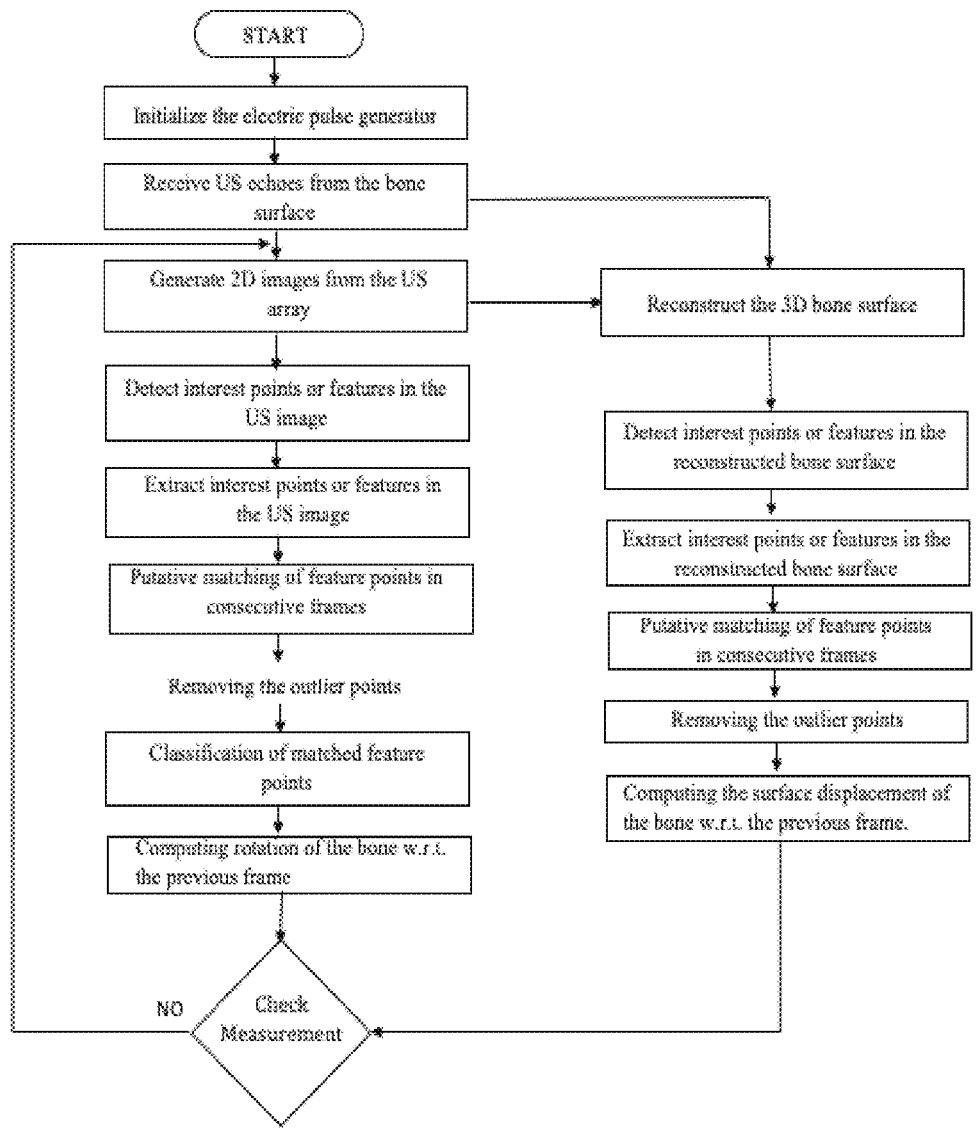
FIG. 4 is a flow chart of a process according to one embodiment of the present invention.
Figure 5:
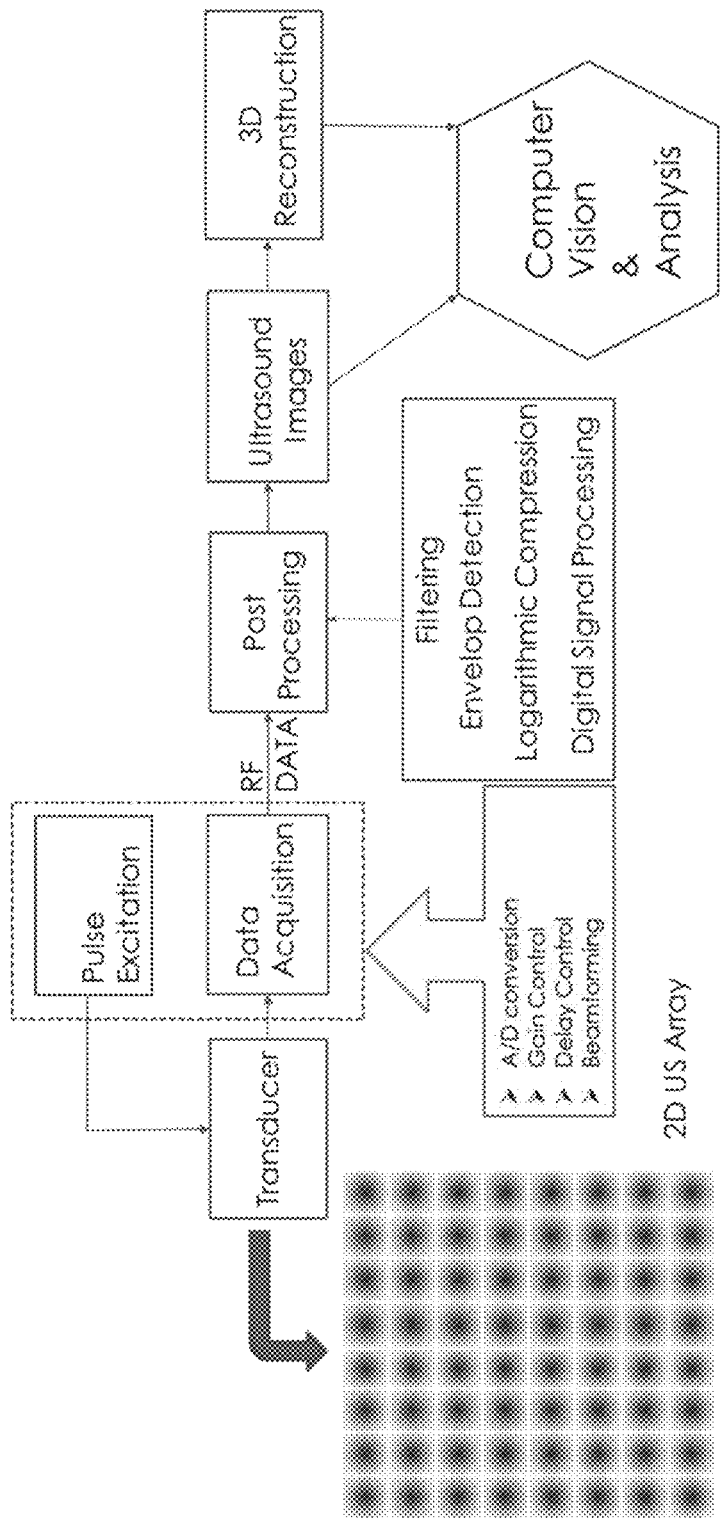
FIG. 5 is a schematic view of the ultrasound system according to a further embodiment of the present invention.

FIG. 3 shows an ultrasound image showing the tracking of the bone along two paths 60, 65. For the ultrasound, it is able to detect the edges of the bone (bony landmarks or markers 70, 75). These are used to track the displacement of markers 70, 75 on a frame-to-frame basis in order to track and measure the rotation of the bone.

With regard to the plot of FIG. 3, the first line 60 indicates the change in the rotation of the bone while the second line 65 indicates the detection of the markers 70, 75 matched. The markers 70, 75 detected are used to calculate the difference in displacement and angle of the bone. The speed of the rotation is then measured by time between the capture of the images.

The IMU 35A computes and identifies the centre of rotation or movement of the joint. The identification of the joint can then be used to identify the location of the hip joint m and the knee joint 15. This allows the tracking of the limb movement and identification of the activity done by the user.

FIGS. 4, 5 and 6A to 6C show the process by which the ultrasound device identifies the markers, creates the images and measures the movement of the bone.

The ultrasound array consists of two-dimensional matrix of ultrasound transducers which are used to emit the ultrasound sound pulses.

Initialize the US Pulse Generator:

The parameters for the electric pulse such as the amplitude and frequency are initialized which excite the ultrasound transducer to emit the ultrasound pulses.

Figure 6A:
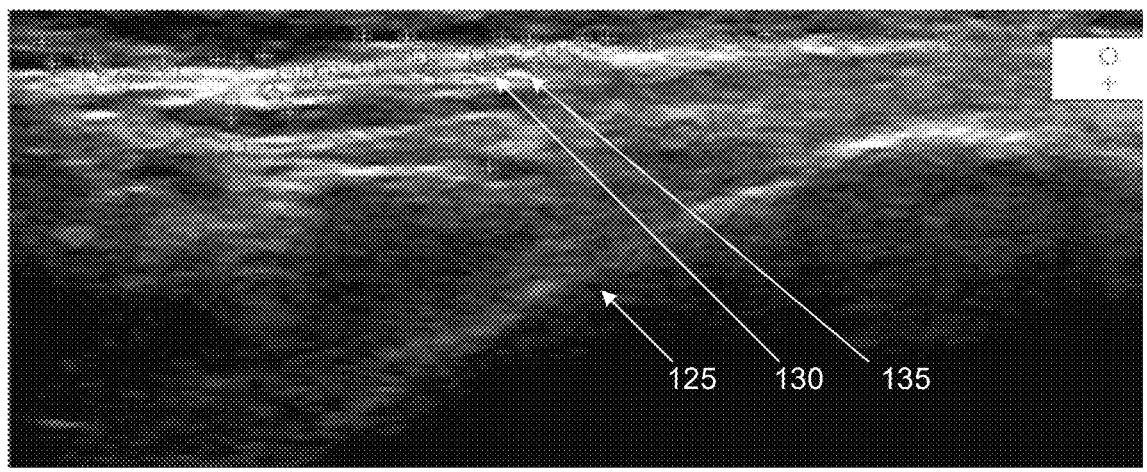
FIGS. 6A to 6C are various tracking ultrasound images for specific layers corresponding to a bone surface as identified by a device according to one embodiment of the present invention.
Figure 6B:
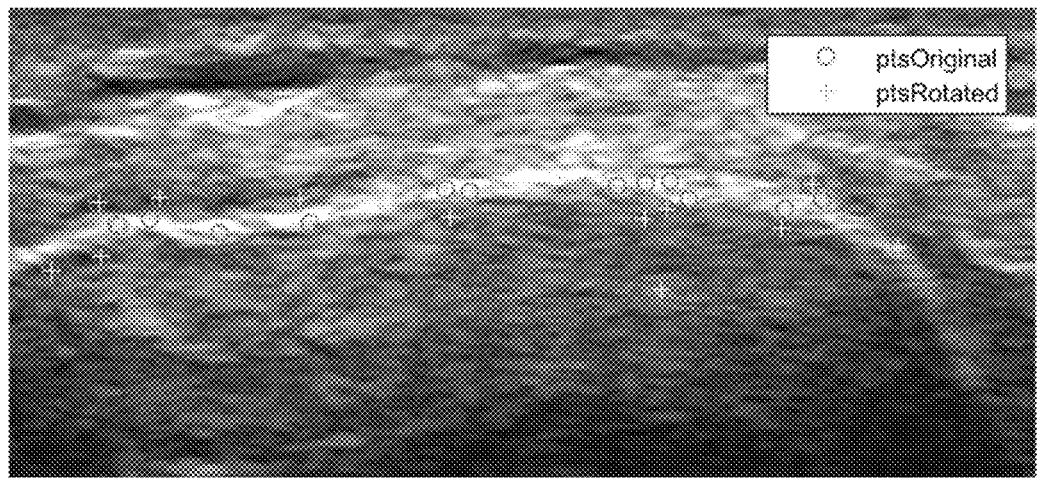
Figure 6C:
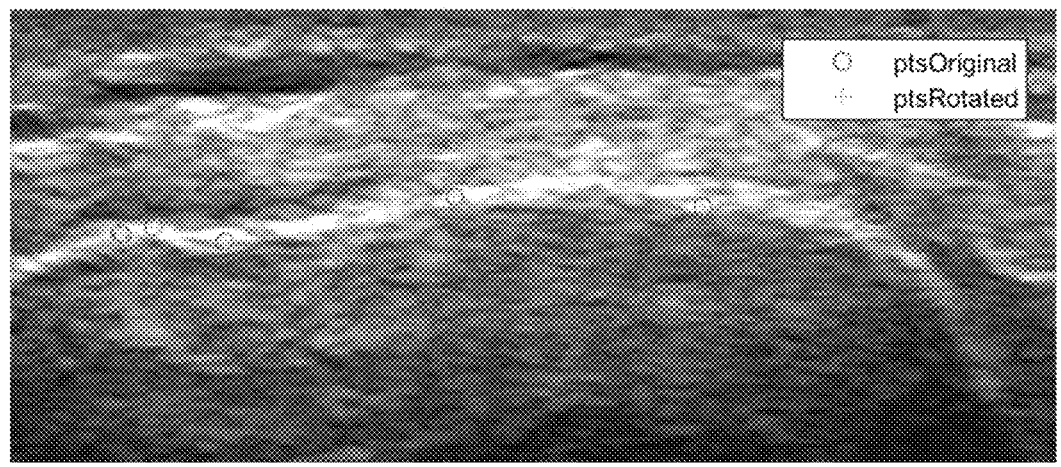

Receive US Echoes from the Bone Surfaces:

The ultrasound pulses emitted from the transducers travels through the muscles tissue and are reflected back from the bone surfaces. These echoes are received by the matrix array which generate RF signals to be converted to an image Generate 2D Images from Each Row of the Ultrasound Array:

The received echoes of the ultrasound array are processed to generate the ultrasound images as shown in FIGS. 6A to 6C. The width of the image is decided by the number of scan lines and height of the image indicates the depth of the reflecting surface.

Reconstruct the 3D Bone Surface from the 2D Images:

The images from ultrasound rows are staked and interpolated to reconstruct the 3D contour 125 of the bone. This 3D surface of the bone will be used to calculate relative motion of the brace 37 w.r.t to the bone and correct the bias of the IMU data for final computation of the motion in 3D.

Detect Markers or Features in the Ultrasound Image

The features or markers 130, 135 are distinct points on the image which are defined by the marker detector. The most important characteristic of a marker detector is repeatability of finding the same point under various conditions such as viewing angle. The neighbourhood of marker is defined by a unique descriptor which are distinct and robust. A scale invariant and rotation invariant marker detector may be used, however other marker detector descriptors may be used based on the application.

By way of an example, for the ultrasound, there are known systems that will image a 1D and 2D matrix where most are 1D ultrasound systems. An example that is applicable for the present invention is to use a 2D ultrasound system to enable a better view of the joint. Alternatively, a 1D/linear system may be able to track the rotation of the bone. In a further embodiment, two aligned 1D ultrasounds may also be suitable for this purpose. In a still further embodiment, a fixed grid 2D ultrasound system is also a viable option for achieving this step in the overall process. It should be noted that, the means by which the marker identification is achieved is outside the scope of the invention, and any viable ultrasound sound that achieves the result of the invention may be used for this purpose.

Putative Matching of Feature Points in Consecutive Frames

The markers on consecutive frames, i.e., the current frame and the previous frame are matched using their descriptors and are bounded by the Euclidean distance.

Classification of Matched Feature Points:

The matched markers are classified as bone or tissues material based on the feature descriptor and depth. This classification is used to identify the bone boundaries and hence the markers which are essential for calculation of the rotation of the bone.

Computing Rotation of the Bone with Respect to the Previous Frame

The rotation of the bone is then calculated by identifying any two markers or more on the bone surface. The displacement of any identified two markers in consecutive frames are used to compute the rotation of the bone around a rotational axis. This method requires minimum two markers as the centre of rotation of the bone is not required or if not known.

$$\theta = \arcsin\left(\frac{\delta'_y \delta_x - \delta'_x \delta_y}{\delta_x^2 + \delta_y^2}\right)$$

Where $\delta_x$ and $\delta_y$ are the change x and y co-ordinates of previous frame, and $\delta'_x$ and $\delta'_y$ are the change x and y co-ordinates of current frame.

Computing the Surface Displacement of the Bone with Respect to the Previous Frame The computation of the surface displacement of the bone is calculated using the co-ordinates of the matched feature points from consecutive frames. A scaling factor is applied to convert image-co-ordinates into standard units.

The force applied to the joint by the relevant muscle is calculated from a measure of the electrical activity generated by muscle activation. This is subsequently calibrated for the patient, who undertakes certain activities, from which a force can be indirectly measured, and so providing a calibration factor between the activity measurements by the EMG to an applied force.

In practical terms, the EMG applies filters to the received signal in order to produce a cleaner and more distinct signal. The types of filters used may be conventionally available filters, including:

Apply filter (Variation: no filter, low pass filter, high pass filter and band pass filter). The signals are then pass through envelope (such as the methods below)

Rectify the EMG signal (Variation: full wave rectification, half wave rectification) and moving average (Variation: adjust size of the moving window)

Root-Mean-Square (Variation: adjust size of the moving window (window size=0.25 second))

The signals may be normalized to identify the threshold of the signals. This process is to help in the identification on the muscle strength used on the activity.

$$\text{Normalized } EMG(\%) = \frac{\text{Actual } EMG \text{ reading}}{\text{Reference } EMG \text{ or Normalization Factor}}$$

Conventional Normalization: Maximum Voluntary Isometric Contraction (MVC or MVIC)

$$\%MVC = \frac{\text{Actual } EMG \text{ reading}}{MVC \text{ value}}$$

For this normalization method, the subject needs to get accustomed to the reference exercise before the test. It requires exertion to the maximum muscular output, thereby leading to poor reproducibility. It is also difficult in execution for aged people or surgical patients, and requires a dynamometer Alternative Normalization Method: Segment Weight Dynamic Movement (SWDM)

$$\%SMDM = \frac{\text{Actual } EMG \text{ reading}}{SWDM \text{ value}}$$

This exercise is designed to be used as normalization reference for moderate activities. The normalized value will go above 100% for more vigorous activities. The load is very low and can be used for evaluating the remaining functionality of a surgical patient, and no special equipment is needed.

The muscle activity level is compared with another limb to track the difference in the movement with respect to ligament and joint health.

Once the IMU's have gathered the rotational data, the ultrasound has gathered the displacement data and the EMG gathered the force data, it needs to be integrated to provide the complete diagnostic assessment of the patient's joint.

Figure 7:
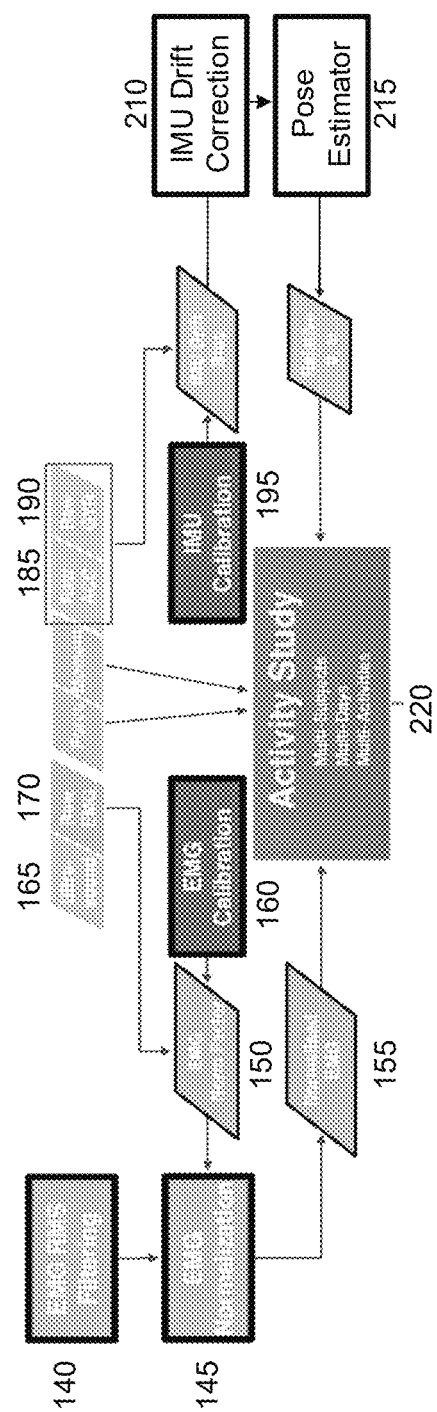
FIG. 7 is a flow chart for the data flow from the EMG and IMU's to the control system according to one embodiment of the present invention.

FIG. 7 provides a schematic for the data gathering process by a control system 220, whereby the various components for the EMG, including filtering and normalisation 140, 145, 155 are provided to the control system 220 following calibration 160 and application of the normalisation factor 150, from which the raw data 165, 170 is amended.

From the IMU data this is similarly corrected 210 following calibration 185 and the pose estimator 215 for estimating a pose position of the bone for correction and correlation with the ultrasound data.

Figure 8:
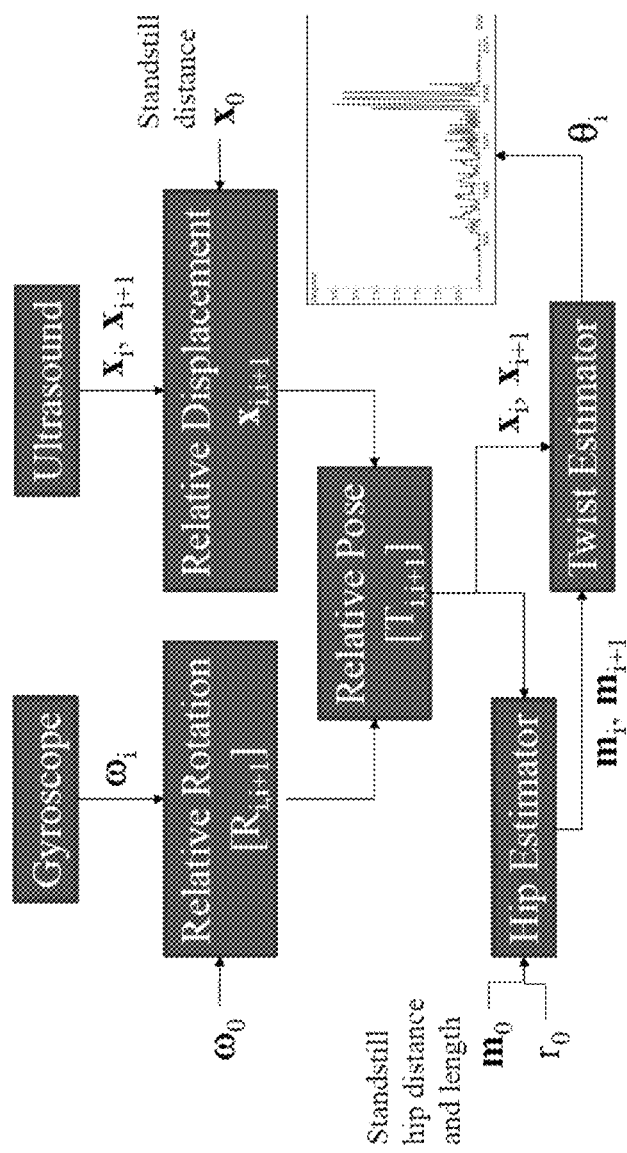
FIG. 8 is an algorithm operated by the control system to correlate the received data according to one embodiment of the present invention.

The control system algorithm, as shown in FIG. 8, provides the relative pose of the bone based upon the rotational data provided by the IMU's and displacement from the ultrasound, which in turn uses the position of the hip and known length to accommodate for twist of the bone during movement.

This identification can then be used to calculate the various parameters corresponding to the dynamic movement of the joint.

Figure 9:
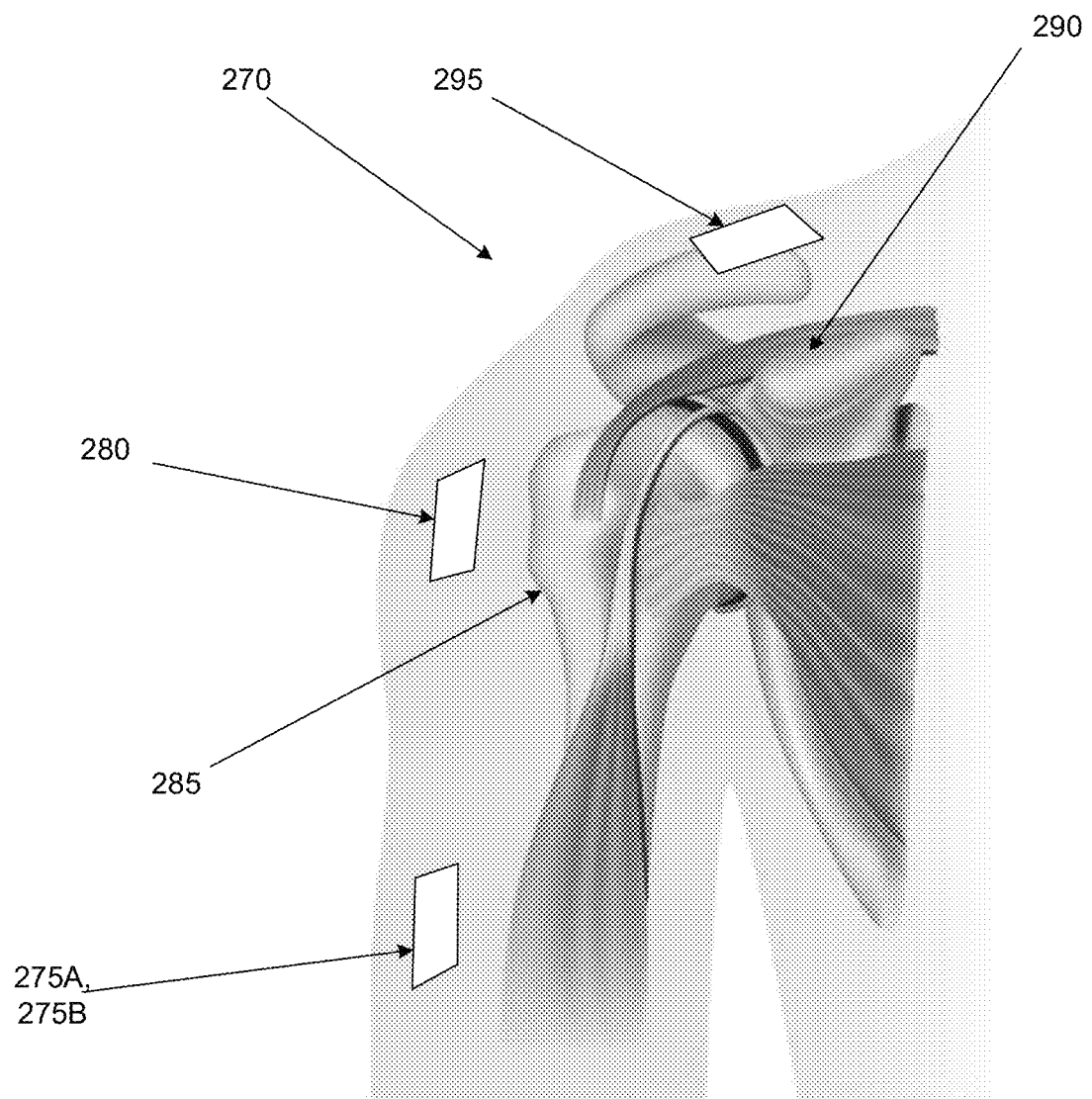
FIG. 9 is a detailed view of a shoulder for which a system according to one embodiment of the present invention has been applied.
Figure 10:
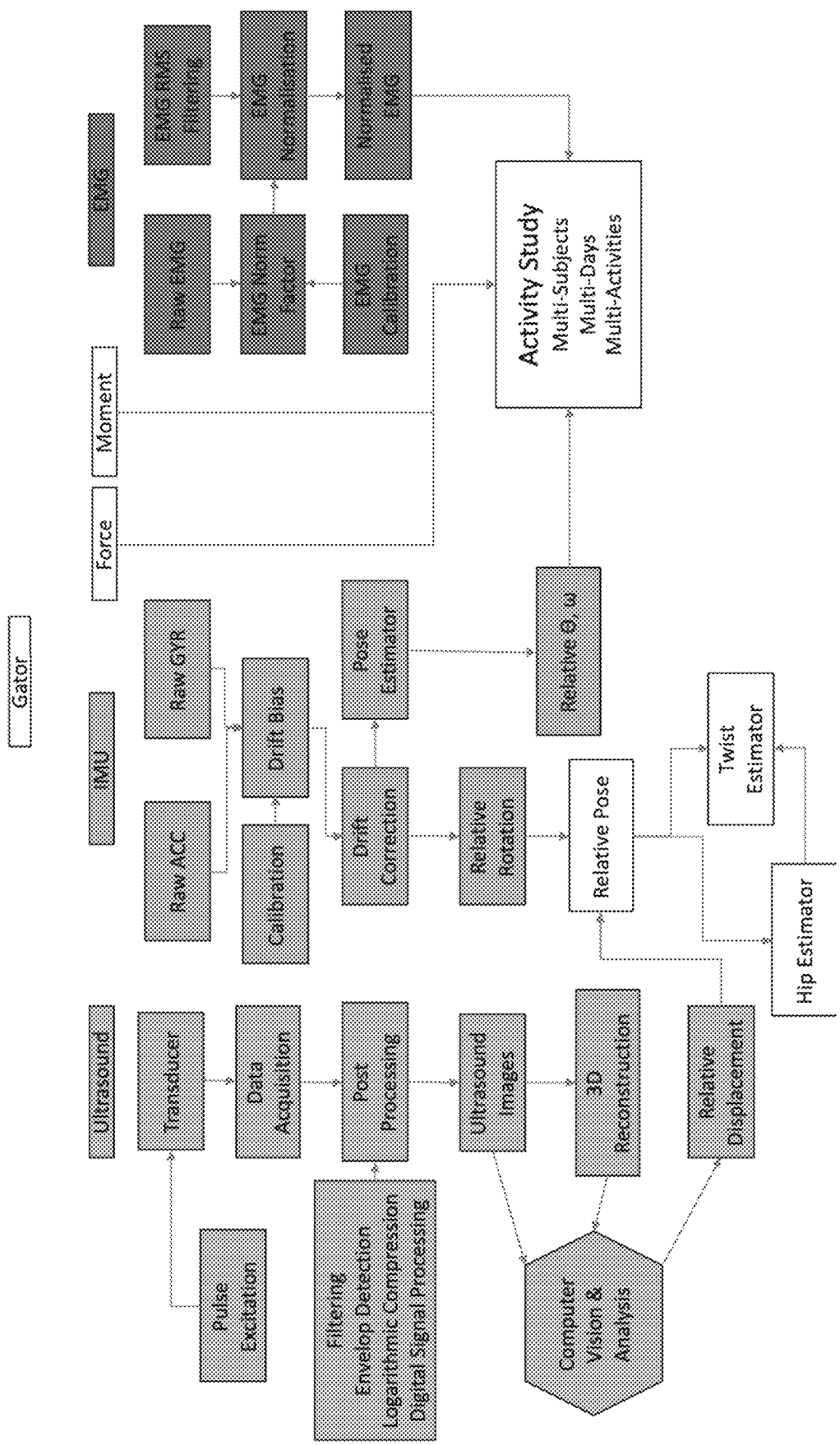
FIG. 10 is a schematic view of joint tracking and monitoring system according to a further embodiment of the present invention.

As mentioned previously, whilst reference has been made to the system being used for the knee joint, the system is equally applicable to other joints. FIG. 9 shows a shoulder 270 to which a first IMU 275A and an ultrasound sensor 280 have been applied to track the movement of the scapula 290 and a second IMU 295 to track the humerus 285. The EMG sensor 275B is also positioned to measure activity in the deltoid (not shown), with all data provided to a control system (not shown) to correlate the information to evaluate the dynamic movement of the joint 270.

In one embodiment, the system may take continuous data of the movement of the user when they are tasked to perform some mid to high intensity activities. The data of the movement may aid in the identification of weakness or abnormality during the activity. The difference in the level can provide a severity level of deficiency for doctors to decide on the mode of treatment.

The user may be performing different levels of activity during the different stages of recovery. Accordingly, the system will pick up the functional level of the joint, and so be monitored on the functionality of the joint before moving to the next level of rehabilitation stage, until the point where the patient has recovered back to the level to engage back with the sports they are doing.

The users may be able to monitor the level of activity done by the sport they are engaging. The monitoring level will allow them to keep track of their efficiency and posture. Further, users who are prone to sport related injuries can be determined before the actual injuries occurs. The trainers are able to create customised training program for their athletics.

The invention claimed is:

1. A method for measuring dynamic movement of a joint, the method comprising the steps of:
   identifying an axis of rotation at the joint based on preliminary profiling exercises using a pair of Inertia measurement units (IMU's), each attached to the skin on either side of said joint;
   measuring relative rotation of the joint around the identified axis of rotation at the joint using the pair of IMU's;
   capturing a plurality of ultrasound images of a bone proximate to a first of said IMU's by an ultrasound sensor placed onto the skin proximate to the pair of IMU's;
   identifying markers on said bone;
   tracking displacement of the markers; and
   correlating said displacement with the relative rotation of the joint to evaluate the dynamic movement of the joint.

2. The method according to claim 1, wherein the identifying markers step further includes matching each of the markers in consecutive frames.

3. The method according to claim 1, wherein the tracking step further includes measuring rotation of each of the markers about a specified axis.

4. The method according to claim 1, further including the steps of:
   creating an electromyogram in a muscle actuating movement of the joint;
   measuring activity data within said muscle; and
   calibrating the activity data and so calculating a force applied by said muscle to the joint.

5. A system for measuring dynamic bone movement in a joint, the system comprising:
   a pair of Inertia measurement units (IMU's), each configured to be attached to the skin on either side of said joint, said IMU's arranged to identify an axis of rotation at the joint and measure relative rotation of the joint around the identified axis of rotation at the joint;
   an ultrasound sensor for capturing a plurality of images of a bone proximate to a first of said IMU's, and identifying markers on said bone and tracking displacement of the markers, said ultrasound sensor configured to be placed onto the skin proximate to the pair of IMU's; and
   a computer configured to receive the measured relative rotation of the joint from said IMU's and the displacement of the markers, and correlate said displacement with the relative rotation of the joint to evaluate the dynamic movement of the joint;
   wherein said computer is configured to calculate the axis of rotation at the joint from measurements by the IMU's of preliminary profiling exercises.

6. The system according to claim 5, further including an electromyography sensor for measuring activity data in a muscle actuating movement of the joint, and providing said activity data to the computer, the computer further arranged to calibrate the activity data so as to calculate a force applied by said muscle to the joint.

* * * * *